(12) United States Patent
Grandchamp et al.

(10) Patent No.: US 6,580,729 B1
(45) Date of Patent: Jun. 17, 2003

(54) SIGNAL MULTIPLEXER AND METHOD

(75) Inventors: Brett J. Grandchamp, Cumberland, ME (US); William A. DeCormier, Poland, ME (US)

(73) Assignee: General Signal Corporation, Charlotte, NC (US)

( * ) Notice: Subject to any disclaimer, the term of this patent is extended or adjusted under 35 U.S.C. 154(b) by 0 days.

(21) Appl. No.: 09/451,000

(22) Filed: Nov. 29, 1999

(51) Int. Cl.[7] ................................................. H04J 1/02
(52) U.S. Cl. ........................................ 370/488; 370/497
(58) Field of Search ................................. 370/203, 206, 370/480, 483, 485, 486, 487, 488, 497; 375/260, 322, 350

(56) References Cited

U.S. PATENT DOCUMENTS

| | | | | |
|---|---|---|---|---|
| 4,029,902 A | | 6/1977 | Bell, Jr. et al. ............... 179/15 |
| 4,204,165 A | * | 5/1980 | Ready ...................... 455/226.1 |
| 4,792,805 A | | 12/1988 | Miglia ......................... 342/372 |
| 4,815,075 A | | 3/1989 | Cameron .................... 370/123 |
| 4,847,574 A | | 7/1989 | Gauthier et al. ............... 33/21 |
| 5,163,181 A | | 11/1992 | Koontz ....................... 455/103 |
| 5,604,747 A | | 2/1997 | Callas ......................... 370/297 |
| 5,663,683 A | | 9/1997 | McCandless ................ 330/286 |
| 5,736,907 A | | 4/1998 | Chen et al. .................. 333/113 |
| 6,240,081 B1 | * | 5/2001 | Khalona ...................... 370/342 |

* cited by examiner

Primary Examiner—Kwang B. Yao
(74) Attorney, Agent, or Firm—Baker & Hostetler LLP

(57) ABSTRACT

A signal multiplexer for N channel signals of different frequency bands that utilizes only N+1 hybrid couplers and presents a constant impedance to the transmitters that supply the N channel signals. The channel signals are coupled by separate ones of N of the N+1 hybrid couplers to N pairs of matched band pass filters. The outputs of the filters are combined in a signal combiner to form a pair of quadrature phase multiplexed channel signals that are converted to a single multiplexed output signal by the remaining hybrid coupler.

27 Claims, 4 Drawing Sheets

SIGNAL MULTIPLEXER AND METHOD

BACKGROUND OF THE INVENTION

1. Field of the Invention

This invention relates to an apparatus and a method for multiplexing signals of different frequency bands, and, in particular, to a low cost signal multiplexer and method that exhibits substantially no reflected energy to the input ports.

2. Description of the Prior Art

Prior art multiplexers include a branch combiner, a star combiner and a manifold combiner. These signal combiners have a serious disadvantage in that they do not present a constant impedance to the inputs that receive the signals. That is, out of band energy is reflected back to the inputs.

Another prior art multiplexer presents a constant impedance to the input. An example of this style of multiplexer is shown in U.S. Pat. No. 4,029,902. As shown in this patent, this style of multiplexer typically has a pair of matched filters, two hybrids and a load for each signal channel. The filtered output of each channel is fed as an input to the next channel and so on. Although reflected energy to the channel inputs is nil, the cost is high because 2N hybrids are required, where N is the number of signals or channels to be multiplexed. Moreover, the bandwidth is limited to the short circuit VSWR (voltage standing wave ratio) of the output hybrid. The short circuit VSWR is dependent on the amplitude balance of the output hybrid of each channel. In coax hybrids, the amplitude balance is controlled in the design of the hybrid by the use of multiple quarter wave coupled sections, which are power limited. In wave guide hybrids, which can take more power, the amplitude balance is limited by the inability to produce multiple quarter wave coupled sections. Consequently, when the bandwidth causes the amplitude ripple to exceed 0.085 dB, the short circuit VSWR exceeds 1.04:1. The sum of the VSWR of the individual channels quickly accumulates until the system exceeds a VSWR of 1.10:1 that is required by the transmitters.

There is a need for a low cost constant input impedance multiplexer as well as a need for a constant impedance multiplexer that is not bandwidth limited by the quality or power produced by components, such as hybrid couplers.

SUMMARY OF THE INVENTION

A multiplexer according to the invention uses only N+1 hybrid couplers to multiplex N signals, while limiting reflected energy to substantially zero at the inputs that receive the signals being multiplexed. The multiplexer includes N hybrid couplers for converting each of the N signals into a pair of quadrature phase signals. There is a pair of matched band pass filters for each signal or channel that filter the quadrature phase signals. The pairs of filtered quadrature phase signals for all the channels are combined in a signal combiner to produce a pair of N channel multiplexed quadrature phase signals. A single output hybrid coupler converts the pair of N frequency band multiplexed quadrature phase signals into a single multiplexed signal.

Each of the N hybrid couplers has a first port that receives one of the N signals. The remaining ports of the N hybrid couplers are connected in a manner to prevent a reflection of energy to the corresponding first port. To this end, each of the hybrid couplers has a second port connected with a load, and third and fourth ports connected with separate ones of the associated pair of matched band pass filters, whereby out of band energy reflected from the band pass filters is steered to the load.

The signal combiner includes a first signal combiner for combining all of the filtered quadrature phase signals of one of the phases and a second signal combiner for combining all of the filtered quadrature phase signals of the other phase. In one embodiment, the first and second signal combiners are first and second manifolds, respectively.

The method according to the invention, converts each of the N signals into a pair of quadrature phase signals. The quadrature phase signals are then filtered. The N pairs of filtered quadrature phase signals are combined to produce a pair of N frequency band multiplexed quadrature phase signals. The pair of N frequency band multiplexed quadrature phase signals are then converted into a single multiplexed signal.

BRIEF DESCRIPTION OF THE DRAWING

Other and further objects, advantages and features of the present invention will be understood by reference to the following specification in conjunction with the accompanying drawings, in which like reference characters denote like elements of structure and:

Figures 2, 4:
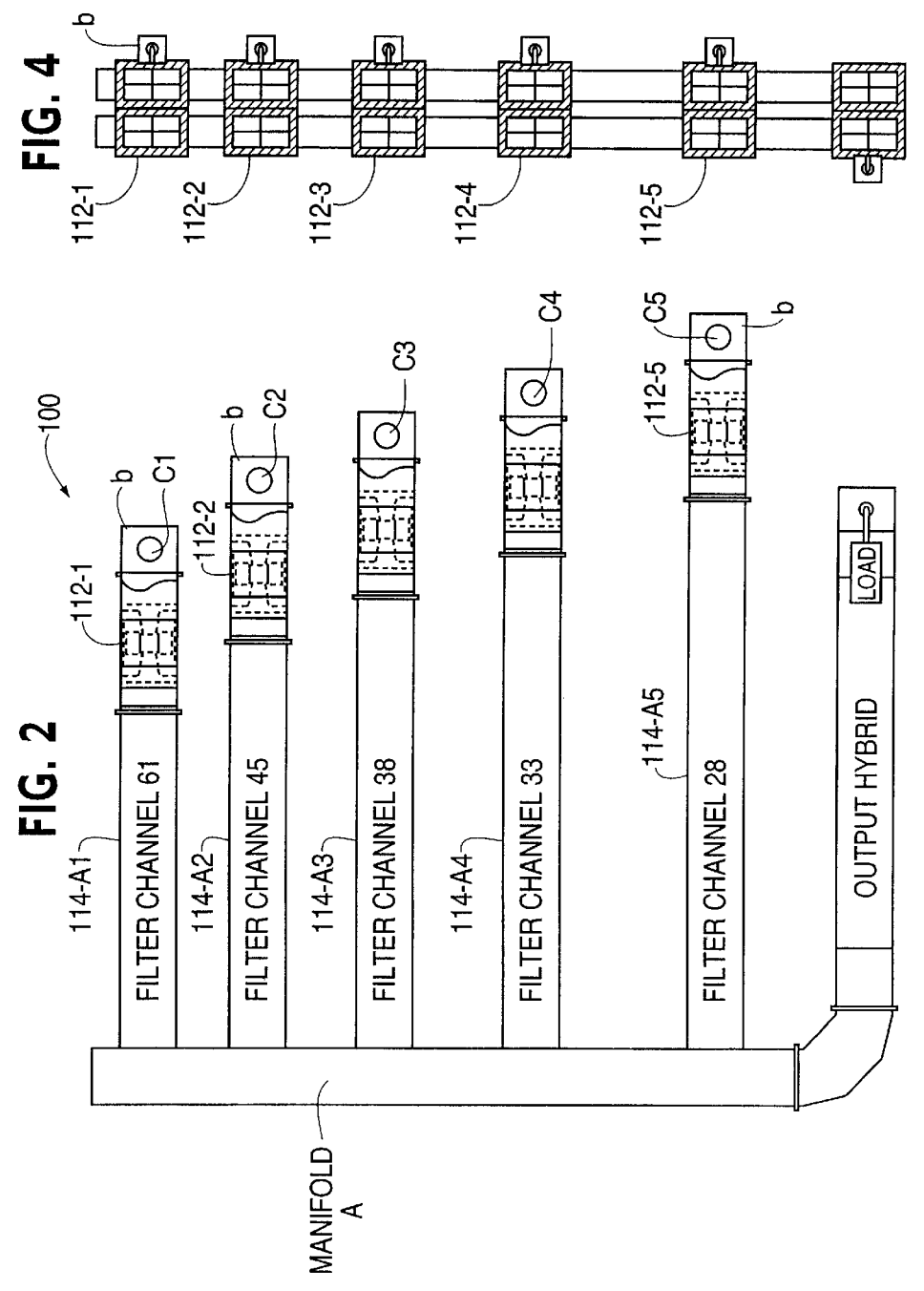

FIG. 2 is a top view of a manifold style multiplexer for the FIG. 1 multiplexer;

FIG. 4 is a side view of FIG. 2;

DESCRIPTION OF THE INVENTION

Figure 1:
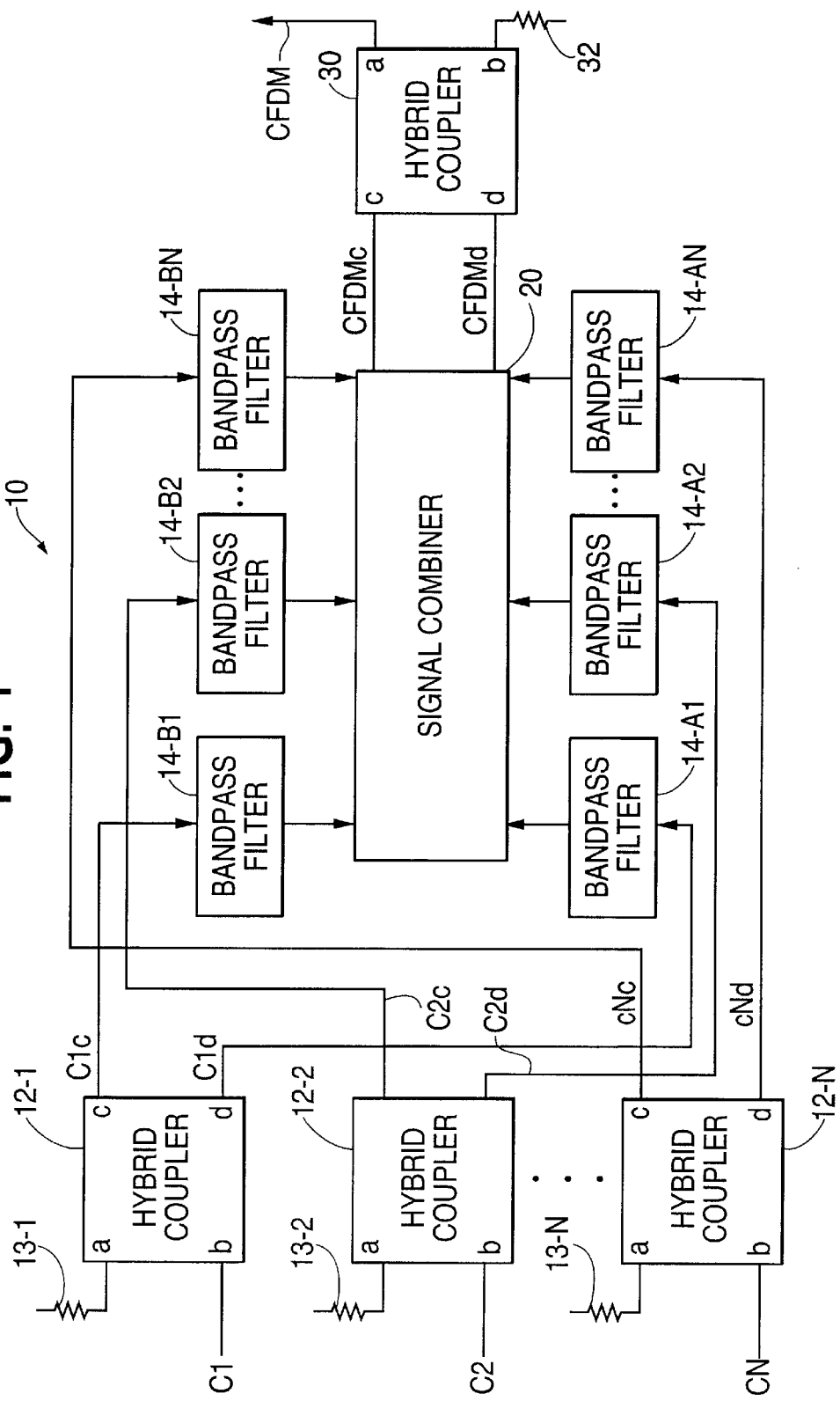
FIG. 1 is a schematic block diagram of a multiplexer according to the present invention.
Figure 5:
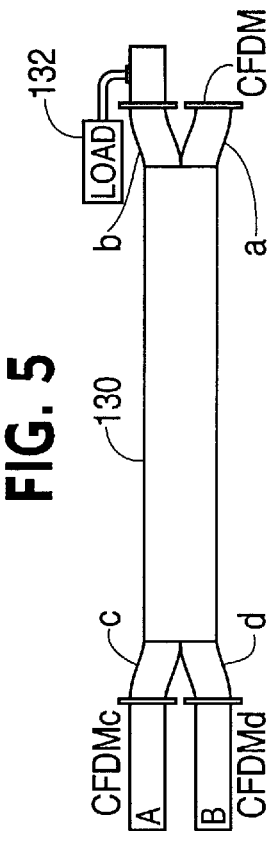
FIG. 5 is an elevation view of the lower end of FIG. 2.

Referring to FIG. 1, there is shown a multiplexer 10 according to the present invention. Multiplexer 10 includes N input hybrid couplers 12-1 and 12-2 through 12-N, where N is two or more, and an output coupler 30 for a total of N+1 hybrid couplers. Hybrid couplers 12-1, 12-2 and 12-N receive input signals C1, C2 and CN, respectively. Signals C1, C2 and CN each have frequencies in a different frequency band or channel and constitute the signals to be multiplexed by multiplexer 10 to a frequency division multiplexed output signal CFDM at output hybrid coupler 30.

The frequencies of signals C1, C2 and CN are dependent on the application in which multiplexer 10 is used. For example, the frequency range for signals C1 through CN is 50 through 806 MHz for television applications and 88 through 108 MHz for FM applications. Those skilled in the art will appreciate that multiplexer 10 can be used in other applications that use other parts of the frequency spectrum.

Hybrid couplers 12-1 through 12-N and 30 are substantially identical and have ports a, b, c, and d. Ports b of input hybrid couplers 12-1, 12-2 and 12-N are connected to receive input signals C1, C2 and CN, respectively. Ports a of input hybrid couplers 12-1, 12-2 and 12-N are connected to a load 13-1, a load 13-2 and a load 13-N, respectively. Input hybrid coupler 12-1 develops one half amplitude quadrature phase signals C1c and C1d at its ports c and d, respectively. Input hybrid coupler 12-2 develops one half amplitude quadrature phase signals C2c and C2d at its ports c and d, respectively. Input hybrid coupler 12-N develops one half amplitude quadrature phase signals CNc and CNd at its ports c and d, respectively.

Multiplexer 10 also includes a first plurality of band pass filters 14-B1 and 14-B2 through 14-BN and a second plurality of band pass filters 14-A1 and 14-A2 through 14-AN. Filters 14-A1 and 14-B1 form a matched pair in that they both have the same pass band filter characteristic that matches the frequency band of input signal C1. Similarly, filters 14-A2 and 14-B2 form a matched pair and filters 14-AN and 14-BN form a matched pair with pass band characteristics that match the frequency bands of signals C1 and CN, respectively.

Quadrature phase signal pair C1c and C1d are applied to matched filter pair 14-B1 and 14A-1, respectively. Quadrature phase signal pair C2c and C2d are applied to matched filter pair 14-B2 and 14-A2, respectively. Quadrature phase signal pair CNc and CNd are applied to matched filter pair 14-BN and 14-AN, respectively.

Multiplexer 10 also includes a signal combiner 20 that combines the filtered quadrature phase signals C1c, C2c, CNc, C1d, C2d and CNd to produce a quadrature phase signal pair CFDMc and CFDMd. Quadrature phase signal pair CFDMc and CFDMd constitute a frequency division multiplexed signal pair for input signals C1 through CN. Quadrature phase signals CFDMc and CFDMd are applied to ports c and d of output hybrid coupler 30. Output hybrid coupler 30 converts quadrature phase signals CFDMc and CFDMd to a single frequency division multiplexed signal CFDM at its output port a. Output port b of output hybrid coupler 30 is connected to a load 32.

Any out of band energy rejected by filters 14-A1 through 14-AN and 14-B1 through 146-BN is reflected back to input hybrid couplers 12-1 through 12-N and absorbed in loads 13-1 through 13-N. For example, out of band energy reflected by matched filter pair 14-1 and 16-1 is absorbed in load 13-1. Thus, multiplexer 10 presents a constant impedance to the transmitters that provide signals C1 through CN.

Signal combiner 20 may be any suitable signal combiner that combines signals of different frequency bands into a frequency division multiplexed signal. For example, signal combiner 20 may be implemented in a manifold style combiner or a star point style combiner.

Figure 3:
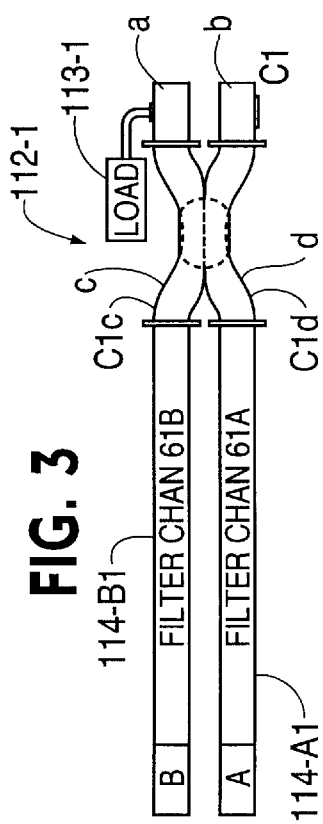
FIG. 3 is an elevation view of the upper end of FIG. 2.

Referring to FIGS. 2 through 5, the FIG. 1 multiplexer is shown in a manifold style multiplexer 100 that is configured to multiplex five channel signals C1 through C5 for television channels 28, 33, 38, 45 and 61. Manifold style multiplexer 100 has input hybrid couplers 112-1 through 112-5 for receiving channel signals C1 through C5 at their respective ports b. Ports a of each input hybrid coupler 112-1 through 112-5 are coupled to separate dummy loads such as load 113-1 shown in FIG. 3 for input hybrid coupler 112-1. Ports c of input hybrid couplers 112-1 through 112-5 are connected to a set of band pass filters, such as band pass filters 114-A1 and 114-B1 as shown in FIGS. 3 for input hybrid coupler 112-1. Input hybrid couplers 112-1 through 112-5 have their ports d connected to separate ones of another set of band pass filters, such as band pass filter 114-A1 shown in FIG. 3 for hybrid coupler 112-1.

Band pass filters 114-B1 through 114-B5 have their outputs connected to a manifold 120A for combining the filtered quadrature phase signals, such as signal C1c for band pass filter 114-B1 shown in FIG. 3. Band pass filters 114-A1 through 114-A5 have their outputs connected to a manifold 120B for combining the filtered quadrature phase signals, such as signal C1d for pass band filter 114-A1 shown in FIG. 3. Manifolds 120A and 120B produce at their respective outputs the quadrature phase signals CFDMc and CFDMd shown in FIG. 5. Manifolds 120A and 120B correspond to and perform the signal combining function as signal combiner 20 of FIG. 1.

Quadrature phase signals CFDMc and CFDMd are applied to ports a and b of an output hybrid 130, respectively. Port b of output hybrid 130 is connected to a load 132. Multiplexed signal CFDM is developed at port a of hybrid output coupler 130 for application to a television broadcast antenna (not shown).

Manifold style multiplexer 100 is shown as using wave guide components for input hybrid couplers 112, band pass filters 114, manifolds 120A and 120B and output hybrid coupler 130. It will be appreciated by those skilled in the art that manifold style multiplexer 100 may be implemented with any combination of wave guide and coax components.

Band pass filters 114-A1 through 114-A5 are located above band pass filters 114-B1 through 114-B5 in a stacked relationship with the stacks of filter pairs being substantially parallel to one another. Manifolds 120A and 120B are positioned in a stacked relationship substantially perpendicular to and are connected to the stacks of filters 114. Output hybrid coupler 130 is positioned substantially parallel to the stacks of filters 114 and is connected to the stacked manifolds 120A and 120B.

Figure 7:
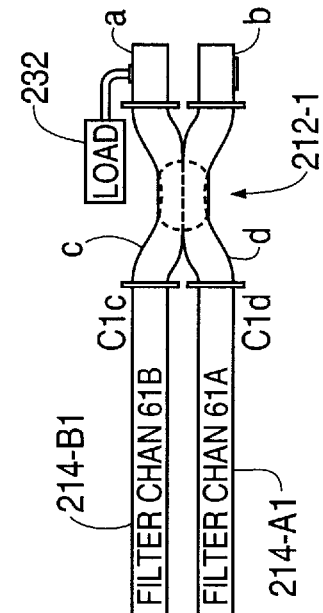
FIG. 7 is a view taken along line 7—7 of FIG. 6.
Figure 7:
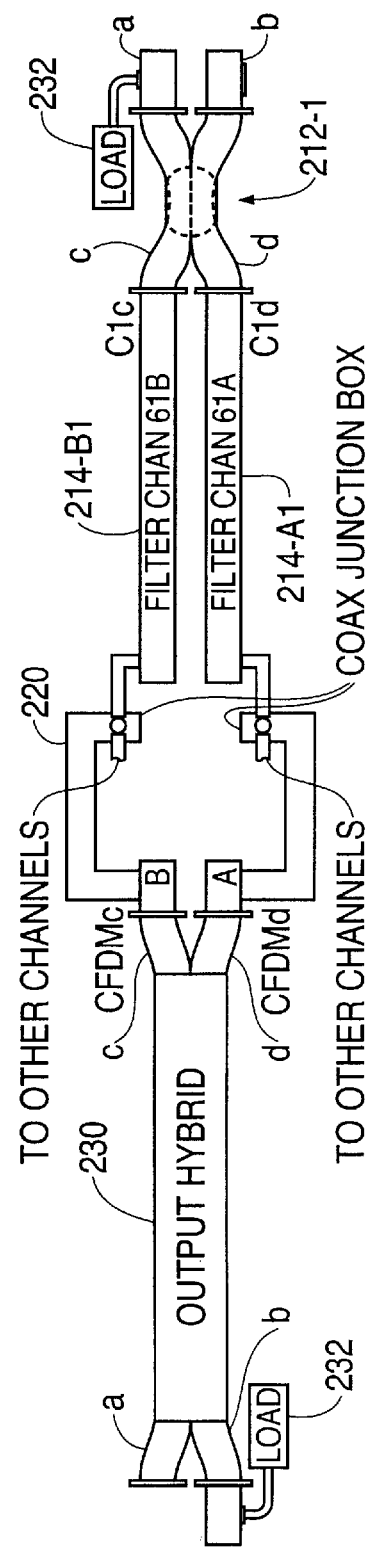
Figure 6:
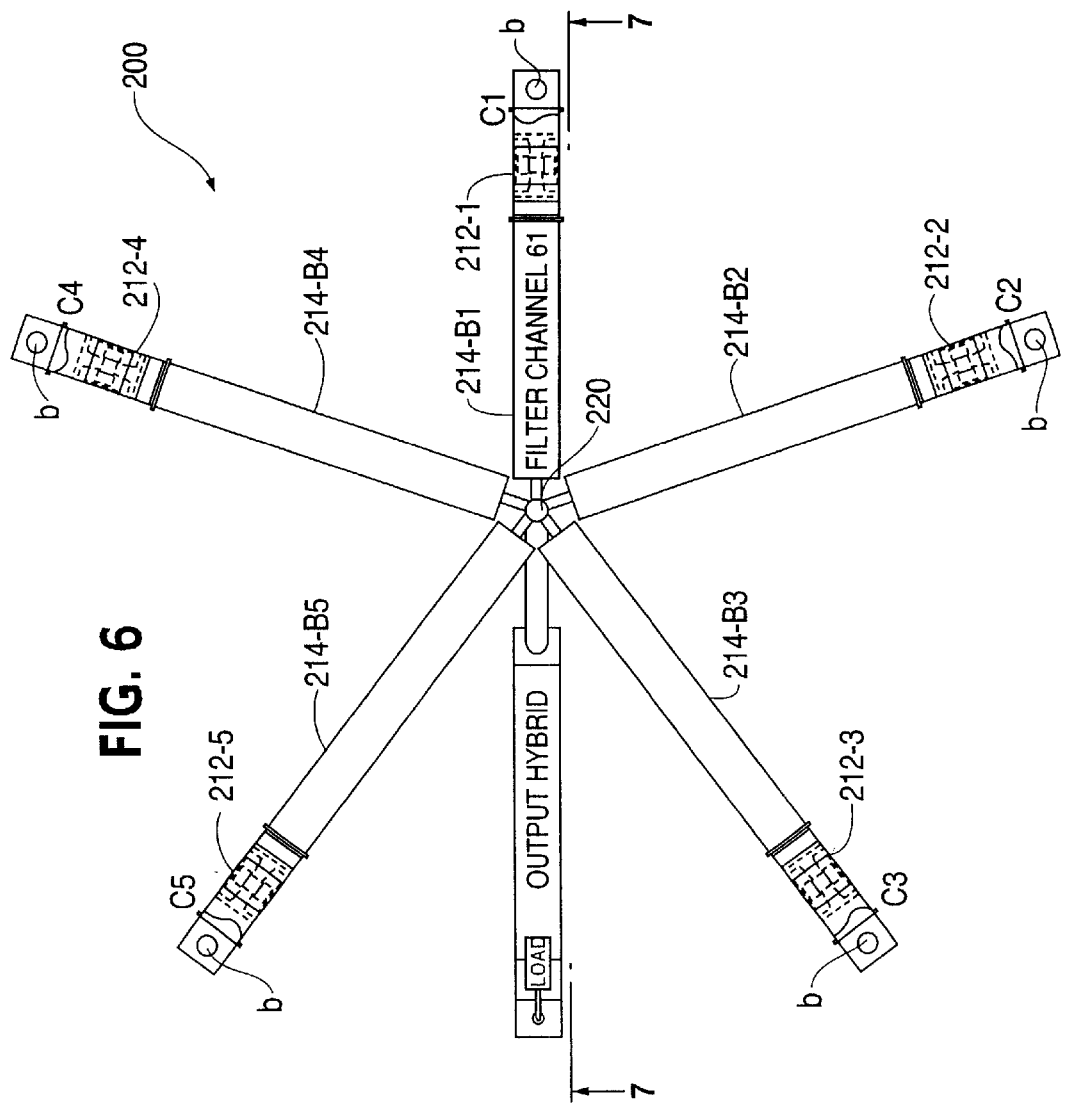
FIG. 6 is a top view of a star point style multiplexer for the FIG. 1 multiplexer.

Referring to FIGS. 6 and 7, the FIG. 1 multiplexer is shown in a star point style multiplexer 200 that is configured to multiplex five channel signals C1 through C5 for five television channels, of which one is designated as channel 61. Star point multiplexer 200 has input hybrid couplers 212-1 through 212-5 coupled to receive channel signals C1 through C5 at their respective ports b. Input hybrid couplers 212-1 through 212-5 produce quadrature phase signals that are filtered in a pair of matched band pass filters, such as band pass filters 214-B1 and 214-A1 for hybrid coupler 212-1 as shown in FIG. 7. Ports a of input hybrid filters 212-1 through 212-5 are connected to dummy loads, such as dummy load 232 shown in FIG. 7 for input hybrid coupler 212-1. Ports c of input hybrid couplers 212-1 through 212-5 are connected to separate ones of a set of band pass filters, such as band pass filter 214-A1 shown in FIG. 7 for input hybrid coupler 212-1. Ports d of input hybrid couplers 212-1 through 212-5 are connected to separate ones of a set of band pass filters, such as band pass filter 214-B1 shown in FIG. 7 for input hybrid coupler 212-1.

Band pass filters 214-A1 through 214-A5 are located above band pass filters 214-B1 through 214-B5 in a stacked relationship. The stacks of filter pairs and output hybrid coupler 230 are configured in a star point geometry and are connected with coax junction box 220 for combining the filtered quadrature phase signals, such as signals C1c and C1d for band pass filters 214-B1 and 214-A1 shown in FIG. 7. Coax junction box 220 combines the filtered channel quadrature phase signals to produce at its outputs the quadrature phase signals CFDMc and CFDMd shown in FIG. 7.

Quadrature phase signals CFDMc and CFDMd are applied to ports c and d of an output hybrid coupler 230, respectively. Port b of output hybrid coupler 230 is connected to a load 232. Multiplexed signal CFDM is developed at port a of output hybrid coupler 230 for application to a television broadcast antenna (not shown).

Star point style multiplexer 200 is shown as using wave guide components for input hybrid couplers 212, band pass filters 214, and output hybrid coupler 230. It will be apparent to those skilled in the art that these components can alternatively be constructed with coax components.

The present invention having been thus described with particular reference to the preferred forms thereof, it will be obvious that various changes and modifications may be made therein without departing from the spirit and scope of the present invention as defined in the appended claims.

What is claimed is:

1. A method of multiplexing N signals, N being two or more, each signal having a different frequency band, the method comprising;
   (a) converting each of the N signals into a pair of quadrature phase signals;
   (b) filtering the quadrature phase signals of a first one of the quadrature phases and filtering the quadrature signals of the second one of the quadrature phases to produce a pair of filtered quadrature phase signals for each frequency band;
   (c) combining all of the filtered quadrature phase signals of the first and second phases to produce a pair of N frequency band multiplexed quadrature phase signals; and
   (d) converting the pair of N frequency band multiplexed quadrature phase signals into a single multiplexed signal.

2. The method of claim 1, wherein step (b) filters out of band energy from the quadrature phase signal of the first phase and from the quadrature phase signal of the second phase.

3. The method of claim 2, wherein the N signals are received at N first ports, and wherein step (a) prevents a reflection of energy to the first ports.

4. A signal multiplexer for multiplexing N signals, N being two or more, each signal having a different frequency band, the signal multiplexer comprising:
   N hybrid couplers for converting each of the N signals into a pair of quadrature phase signals;
   filter means for filtering the quadrature signals of a first one of the quadrature phases and for filtering the quadrature signals of the second one of the quadrature phases to produce a pair of filtered quadrature phase signals for each frequency band;
   signal combiner means for combining all of the filtered quadrature phase signals of the first phase and all of the filtered quadrature phase signals of the second phase to produce a pair of N frequency band multiplexed quadrature phase signals; and
   an output hybrid coupler for converting the pair of N frequency band multiplexed quadrature phase signals into a single multiplexed signal.

5. The signal multiplexer of claim 4, wherein the filtering means includes a pair of matched band pass filters, one for the quadrature phase signal of the first phase and the other for the quadrature phase signal of the second phase.

6. The signal multiplexer of claim 5, wherein each of the N hybrid couplers has a first port that receives one of the N signals, and wherein each of the N hybrid couplers is connected in a manner to prevent a reflection of energy to the corresponding first port.

7. The signal multiplexer of claim 6, wherein each of the N hybrid couplers has a second port connected with a load, and third and fourth ports connected with separate ones of the associated pair of matched band pass filters, whereby out of band energy reflected from the band pass filters is steered to the load.

8. The signal multiplexer of claim 7, wherein the signal combiner means includes a first signal combiner for combining all of the filtered quadrature phase signals of the first phase and a second signal combiner for combining all of the filtered quadrature phase signals of the second phase.

9. The signal multiplexer of claim 8, wherein the first and second signal combiners are first and second manifolds, respectively.

10. The signal multiplexer of claim 9, wherein the first and second manifolds are wave guides that are spatially positioned in a stacked relationship;
    wherein each of the filters of the pairs of matched filters are wave guides that are spatially positioned in a stacked relationship abutting and connected with the first and second manifolds;
    wherein the N hybrid couplers are wave guides that are positioned so as to abut and connect to separate ones of the pairs of matched filters; and
    wherein the output hybrid coupler is a wave guide that is positioned to abut and connect to the first and second manifolds.

11. The signal multiplexer of claim 10, wherein the stacked pairs of matched filters are substantially parallel to one another and substantially perpendicular to the stacked first and second manifolds.

12. The signal multiplexer of claim 11, wherein the output hybrid coupler is substantially parallel to the stacked pairs of matched filters.

13. The signal multiplexer of claim 8, wherein the signal combiner is a coax junction box.

14. The signal multiplexer of claim 13, wherein each of the filters of the pairs of matched filters are wave guides that are spatially positioned in a stacked relationship and connected with the coax junction box;
    wherein the N hybrid couplers are wave guides that are positioned so as to abut and connect to separate ones of the pairs of matched filters; and
    wherein the output hybrid coupler is a wave guide that is positioned to connect to the coax junction box.

15. The signal multiplexer of claim 14, wherein the stacked pairs of matched filters and the output hybrid coupler are spatially arranged in a star point pattern with the coax junction box being at the centroid of the star point pattern.

16. A signal multiplexer for multiplexing N signals, N being two or more, each signal having a different frequency band, the signal multiplexer comprising:
    N hybrid couplers for converting each of the N signals into a pair of quadrature phase signals;
    a filter that filters the quadrature signals of a first one of the quadrature phases and filters the quadrature signals of the second one of the quadrature phases to produce a pair of filtered quadrature phase signals for each frequency band;
    signal combiner that combines all of the filtered quadrature phase signals of the first phase and all of the filtered quadrature phase signals of the second phase to produce a pair of N frequency band multiplexed quadrature phase signals; and
    an output hybrid coupler for converting the pair of N frequency band multiplexed quadrature phase signals into a single multiplexed signal.

17. The signal multiplexer of claim 16, wherein the filter includes a pair of matched band pass filters, one for the quadrature phase signal of the first phase and the other for the quadrature phase signal of the second phase.

18. The signal multiplexer of claim 17, wherein each of the N hybrid couplers has a first port that receives one of the N signals, and wherein each of the N hybrid couplers is connected in a manner to prevent a reflection of energy to the corresponding first port.

19. The signal multiplexer of claim 18, wherein each of the N hybrid couplers has a second port connected with a load, and third and fourth ports connected with separate ones of the associated pair of matched band pass filters, whereby out of band energy reflected from the band pass filters is steered to the load.

20. The signal multiplexer of claim 19, wherein the signal combiner includes a first signal combiner that combines all of the filtered quadrature phase signals of the first phase and a second signal combiner that combines all of the filtered quadrature phase signals of the second phase.

21. The signal multiplexer of claim 20, wherein the first and second signal combiners are first and second manifolds, respectively.

22. The signal multiplexer of claim 21, wherein the first and second manifolds are wave guides that are spatially positioned in a stacked relationship;

wherein each of the filters of the pairs of matched filters are wave guides that are spatially positioned in a stacked relationship abutting and connected with the first and second manifolds;

wherein the N hybrid couplers are wave guides that are positioned so as to abut and connect to separate ones of the pairs of matched filters; and wherein the output hybrid coupler is a wave guide that is positioned to abut and connect to the first and second manifolds.

23. The signal multiplexer of claim 22, wherein the stacked pairs of matched filters are substantially parallel to one another and substantially perpendicular to the stacked first and second manifolds.

24. The signal multiplexer of claim 23, wherein the output hybrid coupler is substantially parallel to the stacked pairs of matched filters.

25. The signal multiplexer of claim 20, wherein the signal combiner is a coax junction box.

26. The signal multiplexer of claim 25, wherein each of the filters of the pairs of matched filters are wave guides that are spatially positioned in a stacked relationship and connected with the coax junction box;

wherein the N hybrid couplers are wave guides that are positioned so as to abut and connect to separate ones of the pairs of matched filters; and wherein the output hybrid coupler is a wave guide that is positioned to connect to the coax junction box.

27. The signal multiplexer of claim 26, wherein the stacked pairs of matched filters and the output hybrid coupler are spatially arranged in a star point pattern with the coax junction box being at the centroid of the star point pattern.

* * * * *